United States Patent
Saito

(10) Patent No.: US 9,441,879 B2
(45) Date of Patent: Sep. 13, 2016

(54) DRYING METHOD AND DRYING DEVICE FOR GREEN HONEYCOMB MOLDED BODY

(75) Inventor: Hirofumi Saito, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 436 days.

(21) Appl. No.: 14/002,885

(22) PCT Filed: Mar. 6, 2012

(86) PCT No.: PCT/JP2012/055724
§ 371 (c)(1),
(2), (4) Date: Sep. 26, 2013

(87) PCT Pub. No.: WO2012/121262
PCT Pub. Date: Sep. 13, 2012

(65) Prior Publication Data
US 2014/0007452 A1 Jan. 9, 2014

(30) Foreign Application Priority Data
Mar. 7, 2011 (JP) ................................. 2011-049267

(51) Int. Cl.
*F26B 3/34* (2006.01)
*B28B 11/24* (2006.01)
(Continued)

(52) U.S. Cl.
CPC ............. *F26B 3/343* (2013.01); *B28B 11/241* (2013.01); *B28B 11/243* (2013.01);
(Continued)

(58) Field of Classification Search
CPC .... F26B 21/006; F26B 2210/02; F26B 3/06; F26B 3/343; F26B 3/347; B28B 11/241; B28B 11/243; B28B 11/247; C04B 35/478; C04B 38/006; C04B 2235/3418; C04B 2235/36; C04B 2235/3206; C04B 2235/5445; C04B 2111/0079; C04B 2111/0081
See application file for complete search history.

(56) References Cited

U.S. PATENT DOCUMENTS 7,422,719 B2 * 9/2008 Chan .................... F26B 21/006
264/630
2003/0102602 A1 6/2003 Miura
(Continued)

FOREIGN PATENT DOCUMENTS

DE 3734818 A1 * 4/1989 ............. F26B 25/12
EP 2168741 A2 3/2010
(Continued)

OTHER PUBLICATIONS

International Preliminary Report on Patentability and Written Opinion issued Sep. 19, 2013 in International Application No. PCT/JP2012/055724.
(Continued)

*Primary Examiner* — Jiping Lu
(74) *Attorney, Agent, or Firm* — Sughrue Mion, PLLC

(57) ABSTRACT

The drying method for a green honeycomb molded body according to the invention is a method for drying a green honeycomb molded body having a plurality of through-holes. The method includes the steps of: mounting a green honeycomb molded body on a gas dispersion plate; and irradiating the molded body with microwaves simultaneously while supplying heated air through the gas dispersion plate into the through-holes of the molded body, in an atmosphere containing water vapor surrounding the molded body; wherein prior to the supply of heated air and the irradiation of microwaves, a sealing member is situated on the outer side of an edge of the molded body on the gas dispersion plate side, to prevent the heated air from the gas dispersion plate from contacting the outer peripheral wall of the molded body.

4 Claims, 6 Drawing Sheets

(51) Int. Cl.

| | | |
|---|---|---|
| *F26B 3/347* | (2006.01) | |
| *F26B 21/00* | (2006.01) | |
| *F26B 3/06* | (2006.01) | |
| *C04B 35/478* | (2006.01) | |
| *C04B 38/00* | (2006.01) | |
| *C04B 111/00* | (2006.01) | |

(52) U.S. Cl.
CPC .......... *B28B 11/247* (2013.01); *C04B 35/478* (2013.01); *C04B 38/0006* (2013.01); *F26B 3/06* (2013.01); *F26B 3/347* (2013.01); *F26B 21/006* (2013.01); *C04B 2111/0081* (2013.01); *C04B 2111/00793* (2013.01); *C04B 2235/3206* (2013.01); *C04B 2235/3418* (2013.01); *C04B 2235/36* (2013.01); *C04B 2235/5436* (2013.01); *C04B 2235/5445* (2013.01); *F26B 2210/02* (2013.01)

(56) References Cited

U.S. PATENT DOCUMENTS

| | | |
|---|---|---|
| 2004/0079469 A1 | 4/2004 | Chan et al. |
| 2006/0042116 A1 | 3/2006 | Terazawa et al. |
| 2006/0278300 A1 | 12/2006 | Coudamy |
| 2010/0078859 A1* | 4/2010 | Takagi .................. B28B 11/241 264/432 |

FOREIGN PATENT DOCUMENTS

| | | |
|---|---|---|
| JP | 1-503136 A | 10/1989 |
| JP | 2003-170413 A | 6/2003 |
| JP | 2005-131800 A | 5/2005 |
| JP | 2006-88685 A | 4/2006 |
| JP | 2008-110541 A | 5/2008 |
| JP | 2012-066404 A | 4/2012 |
| JP | 2012-086559 A | 5/2012 |

OTHER PUBLICATIONS

International Search Report mailed Jun. 5, 2012 in International Application No. PCT/JP2012/055724.

Communication from the European Patent Office issued Jul. 18, 2014, in a counterpart European Application No. 12754420.3.

* cited by examiner

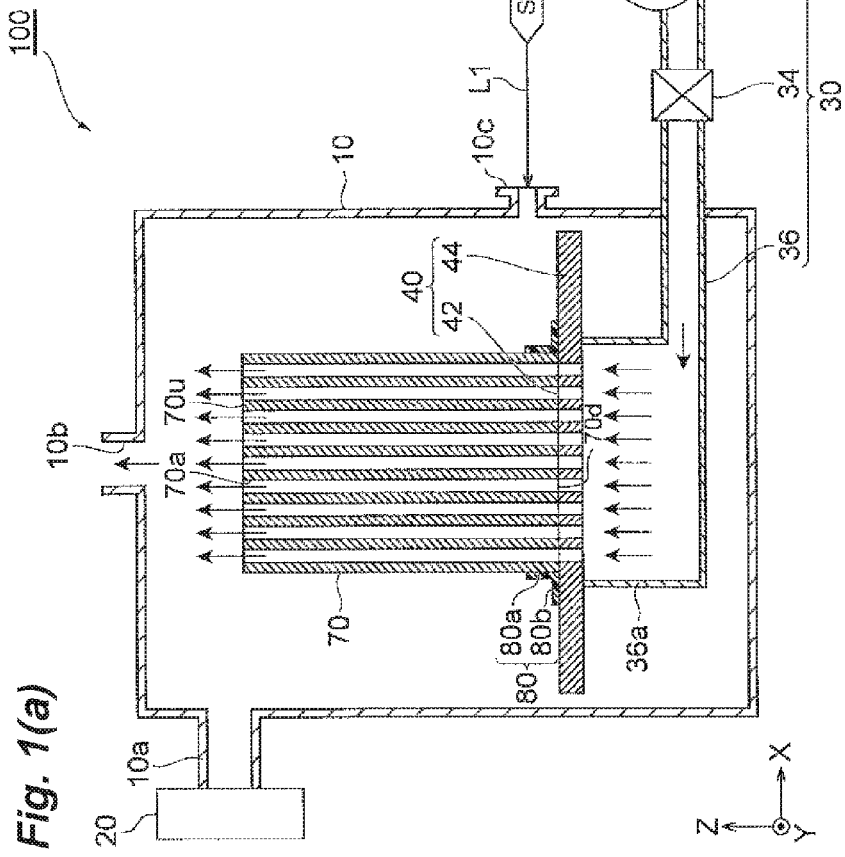
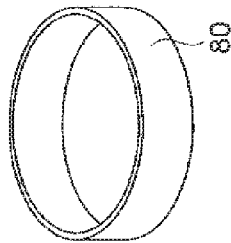
Fig. 1(a)
Fig. 1(b)

DRYING METHOD AND DRYING DEVICE FOR GREEN HONEYCOMB MOLDED BODY

CROSS REFERENCE TO RELATED APPLICATIONS

This application is a National Stage of International Application No. PCT/JP2012/055724 filed Mar. 6, 2012, claiming priority based on Japanese Patent Application No. 2011-049267filed Mar. 7, 2011, the contents of all of which are incorporated herein by reference in their entirety.

TECHNICAL FIELD

The present invention relates to a drying method and a drying device for a green honeycomb molded body.

BACKGROUND ART

A ceramic honeycomb structure with numerous through-holes is produced by molding a green honeycomb molded body containing ceramic starting material powder and a solvent, and drying and firing it. Patent Literature 1 below discloses a method using microwaves and heated air, as a method of drying a green honeycomb molded body.

CITATION LIST

Patent Literature

[Patent Literature 1] JP-T-01-503136

SUMMARY OF INVENTION

Technical Problem

In the prior art methods, however, the green honeycomb molded body undergoes deformation or cracking during drying.

In light of this problem, it is an object of the present invention to provide a drying method and a drying device for a green honeycomb molded body, which can minimize deformation and cracking of the green honeycomb molded body during drying.

Solution to Problem

The invention provides a method of drying a green honeycomb molded body having a plurality of through-holes, using microwaves and heated air, the method comprising the steps of: mounting a green honeycomb molded body on a gas dispersion plate capable of releasing heated air; and irradiating the green honeycomb molded body with microwaves simultaneously while supplying heated air through the gas dispersion plate into the through-holes of the green honeycomb molded body, in an atmosphere containing water vapor surrounding the green honeycomb molded body; wherein prior to the supply of heated air and the irradiation of microwaves, a sealing member is situated on the outer side of an edge of the green honeycomb molded body on the gas dispersion plate side, to prevent the heated air from the gas dispersion plate from contacting the outer peripheral wall of the green honeycomb molded body.

The invention also provides a drying device for a green honeycomb molded body having a plurality of through-holes, the device comprising a container; a microwave source that supplies microwaves into the container; a heated air source that supplies heated air into the container; a water vapor supply port that supplies water vapor into the container; a gas dispersion plate in the container, that supplies heated air from the heated air source onto one end face on which the openings of the plurality of through-holes are formed in the green honeycomb molded body; and a sealing member situated on the outer side of an edge on the gas dispersion plate side of the green honeycomb molded body, that prevents heated air from the gas dispersion plate from contacting the outer peripheral wall of the green honeycomb molded body.

When the region of the gas dispersion plate through which heated air is released (the gas-releasing region) is larger than the end face of the green honeycomb molded body, the sections of the gas-releasing region not covered by the end face of the green honeycomb molded body are preferably plugged by the sealing member. The green honeycomb molded body is readily deformed at the initial stage of drying, during which a large amount of solvent remains. By avoiding release of heated air from the sections not covered by the end face of the green honeycomb molded body, as mentioned above, it is possible to effectively inhibit deformation during the initial stage of drying, and to more reliably prevent deformation and cracking of the molded body.

According to the invention, the sealing member is preferably made of a material capable of following the contraction that occurs during drying of the green honeycomb molded body. For example, even if the entire gas-releasing region is covered by the end face of the green honeycomb molded body in the initial stage of drying, the gas-releasing region can sometimes be exposed if the area of the end face of the green honeycomb molded body decreases during drying. By using a sealing member capable of following contraction of the green honeycomb molded body, it is possible to sufficiently prevent leakage of heated air from this region to the outer side of the green honeycomb molded body during drying. This can more reliably prevent excessive drying of the outer peripheral wall of the green honeycomb molded body.

In addition, using a sealing member made of such a material can effectively avoid inconveniences such as the following. Specifically, because the through-holes of the green honeycomb molded body have relatively high pressure loss, exposure of the gas-releasing region with contraction of the green honeycomb molded body tends to result in a large amount of heated air flowing from that region to the outer side of the molded body, and less gas flowing through the through-holes of the molded body. When this condition occurs, drying of the molded body interior becomes insufficient, and problems such as collapse of the cells and cracking of the molded body are produced in the post-drying steps (for example the cutting step).

Advantageous Effects of Invention

According to the invention it is possible to provide a drying device and a drying method for a green honeycomb molded body, that can prevent deformation and cracking of the green honeycomb molded body during drying.

BRIEF DESCRIPTION OF DRAWINGS

FIG. 1(a) is a simplified cross-sectional view of a drying device according to the first embodiment, and FIG. 1(b) is a perspective view of the sealing member 80 in FIG. 1(a).

DESCRIPTION OF EMBODIMENTS

Figure 2:
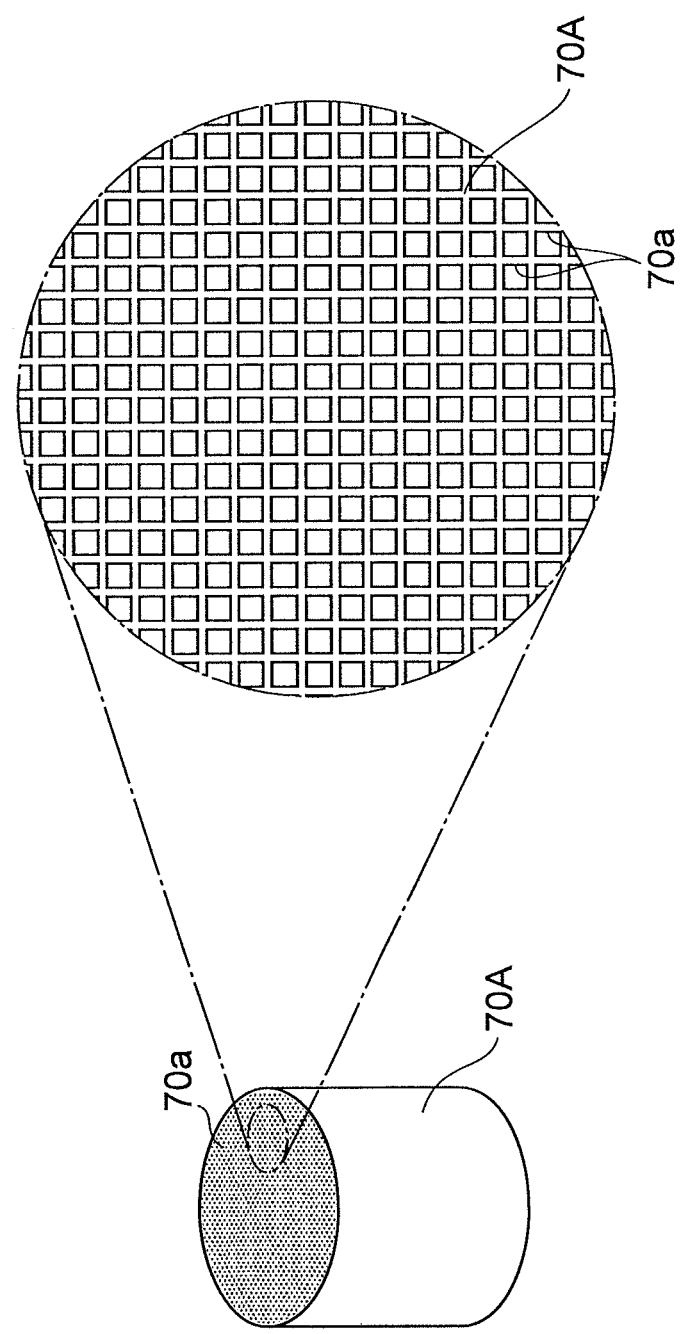
FIG. 2 is a perspective view showing an example of a green honeycomb molded body.

Preferred embodiments of the drying device for a green honeycomb molded body according to the invention will now be explained with reference to FIG. 1(a). Throughout the explanation, identical or similarly functioning elements will be referred to by like reference numerals and will be explained only once.

<First Embodiment>

(Drying Device)

The drying device 100 of the green honeycomb molded body of this embodiment serves to dry a green honeycomb molded body 70, and it mainly comprises a container 10, a microwave source 20 that supplies microwaves into the container 10, a mounting stage 40 situated inside the container 10, a heated air source 30 that supplies heated air to the plurality of through-holes 70a of the green honeycomb molded body 70 through a gas dispersion plate (gas outlet) 42 of the mounting stage 40, and a sealing member 80 that prevents heated air from the gas dispersion plate 42 from contacting the outer side of the green honeycomb molded body 70.

(Green Honeycomb Molded Body)

First, the green honeycomb molded body 70 that is to be dried will be explained.

The green honeycomb molded body 70 according to this embodiment is a cylinder with a plurality of through-holes 70a each extending in the Z-axial direction, as shown in FIG. 1. There are no particular restrictions on the outer shape of the green honeycomb molded body 70, and for example, it may be circular columnar, elliptic cylindrical, prismatic (for example, regular polygonal columnar such as equilateral triangular columnar, square columnar, regular hexagonal columnar or regular octagonal columnar, or a triangular columnar, square columnar, hexagonal columnar or octagonal columnar shape other than a regular polygonal columnar shape). The cross-sectional shapes of each of the through-holes 70a are also not particularly restricted, and for example, they may be circular, elliptical or polygonal such as square, rectangular, triangular or hexagonal. The through-holes 70a may also include a combination of different sizes and different cross-sectional shapes.

There are no particular restrictions on the arrangement of the through-holes 70a as seen from the end face of the green honeycomb molded body 70 in the Z-axial direction, and for example, it may be a square arrangement in which the central axes of the through-holes 70a are disposed each at the vertices of a square, or a regular triangular arrangement in which the central axes of the through-holes 70a are disposed at the vertices of a regular triangle.

The sizes of the through-holes 70a are also not particularly restricted, and if the cross-section is square, for example, the sides may be 0.8 to 2.5 mm. The thicknesses of the partitions separating the through-holes 70a from each other may be, for example, 0.15 to 0.76 mm.

There are no particular restrictions on the lengths of the through-holes 70a of the green honeycomb molded body 70 in the direction of their extension (the full lengths in the Z-direction), and they may be 40 to 350 mm, for example. There are also no particular restrictions on the outer diameter of the green honeycomb molded body 70, and it may be 100 to 320 mm, for example.

Figure 3:
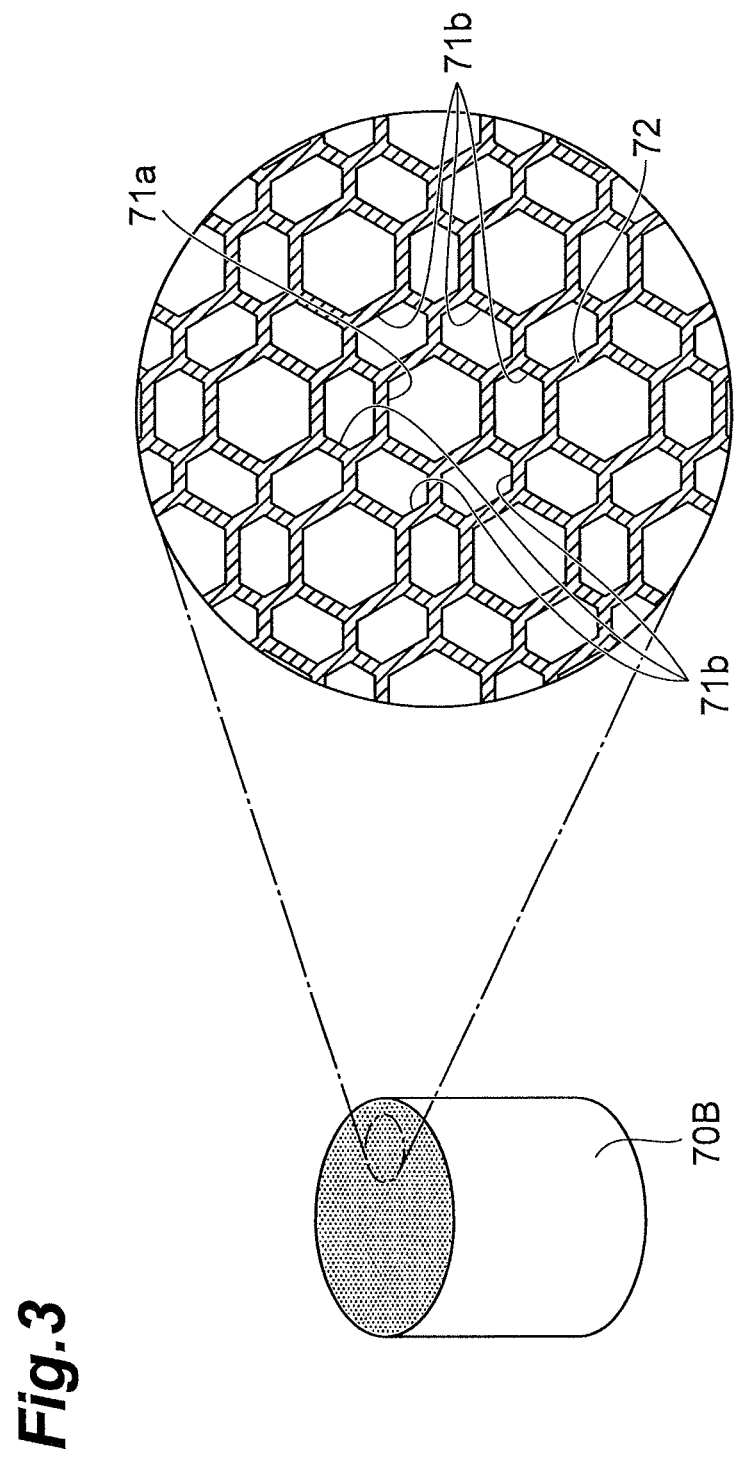
FIG. 3 is a perspective view showing another example of a green honeycomb molded body.

FIG. 2 and FIG. 3 show concrete examples of the green honeycomb molded body 70. The green honeycomb molded body 70A shown in FIG. 2 has through-holes 70a with square cross-sectional shapes. The green honeycomb molded body 70B shown in FIG. 3 has a plurality of through-holes 71a, 71b with different cross-sectional shapes. The plurality of through-holes 71a, 71b are partitioned by partitions 72 extending substantially parallel to the central axis of the green honeycomb molded body 70B. The through-holes 71a have cross-sectional shapes that are regular hexagonal. The through-holes 71b, on the other hand, have cross-sectional shapes that are flattened hexagonal, and they are disposed surrounding the through-holes 71a.

The green honeycomb molded body 70 is a green body (unfired body) that is to become a ceramic by subsequent firing, and it is most preferably a green body for a porous ceramic. Specifically, the green honeycomb molded body 70 contains a ceramic starting material. The ceramic is not particularly restricted, and examples include oxides such as alumina, silica, mullite, cordierite, glass and aluminum titanate, and silicon carbide, silicon nitride, metals and the like. Aluminum titanate may further include magnesium and/or silicon.

The green honeycomb molded body 70 preferably includes an inorganic compound source powder as the ceramic starting material, an organic binder such as methyl cellulose, and additives that are added as necessary.

For example, when the ceramic is aluminum titanate, the inorganic compound source powder may include an aluminum source powder such as α-alumina powder, and a titanium source powder such as anatase or rutile titania powder, and/or aluminum titanate powder, and if necessary, also a magnesium source powder such as magnesia powder or magnesia spinel powder, and/or a silicon source powder such as silicon oxide powder or glass frit.

Examples of organic binders include celluloses such as methyl cellulose, carboxylmethyl cellulose, hydroxyalkyl-methyl cellulose and sodium carboxylmethyl cellulose; alcohols such as polyvinyl alcohol; and ligninsulfonic acid salts. The amount of organic binder is preferably no greater than 20 parts by weight, more preferably no greater than 15 parts by weight and even more preferably no greater than 6 parts by weight, with respect to 100 parts by weight of the inorganic compound source powder. The lower limit for the organic binder is preferably 0.1 part by weight and more preferably 3 parts by weight.

Examples of additives include pore-forming agents, lubricants, plasticizers, dispersing agents and solvents.

Pore-forming agents include carbon materials such as graphite; resins such as polyethylene, polypropylene and polymethyl methacrylate; plant materials such as starch, nut shells, walnut shells and corn; ice; and dry ice. The amount of pore-forming agent to be added is preferably 0 to 40 parts by weight and more preferably 0 to 25 parts by weight, with respect to 100 parts by weight of the inorganic compound source powder.

Lubricants include alcohols such as glycerin; higher fatty acids such as caprylic acid, lauric acid, palmitic acid, arachidic acid, oleic acid and stearic acid; and stearic acid metal salts such as aluminum stearate. The amount of lubricant addition is preferably 0 to 10 parts by weight and more preferably 1 to 5 parts by weight, with respect to 100 parts by weight of the inorganic compound source powder.

The plasticizer may be a polyoxyalkylenealkyl ether, for example. The amount of plasticizer is preferably 0.1 to 20 parts by weight, more preferably 0.1 to 10 parts by weight and even more preferably 0.1 to 6 parts by weight with respect to 100 parts by weight of the inorganic compound source powder.

Examples of dispersing agents include inorganic acids such as nitric acid, hydrochloric acid and sulfuric acid; organic acids such as oxalic acid, citric acid, acetic acid, malic acid and lactic acid; alcohols such as methanol, ethanol and propanol; and surfactants such as ammonium polycarboxylate. The amount of dispersing agent to be added is preferably 0 to 20 parts by weight and more preferably 2 to 8 parts by weight, with respect to 100 parts by weight of the inorganic compound source powder.

Examples of solvents to be used include alcohols such as methanol, ethanol, butanol and propanol; glycols such as propylene glycol, polypropylene glycol and ethylene glycol; and water. Water is preferred among these, and more preferably ion-exchanged water is used for a low impurity content. The amount of solvent used is preferably 10 to 100 parts by weight and more preferably 20 to 80 parts by weight, with respect to 100 parts by weight of the inorganic compound source powder.

The weight of the solvent with respect to the weight of the entire molded body is not particularly restricted, but it is preferably 10 to 30 wt % and more preferably 15 to 20 wt %.

Such a green honeycomb molded body 70 can be produced in the following manner, for example.

First, the inorganic compound source powder, organic binder, solvent and if necessary additives to be added, are prepared. These are mixed with a kneader or the like to obtain a starting mixture, and the obtained starting mixture may be extruded from an extruder having an outlet opening corresponding to the cross-sectional shape of the green honeycomb molded body, and then cut to a prescribed length to obtain a green honeycomb molded body 70.

(Container)

The container 10 is able to house the green honeycomb molded body 70, the mounting stage 40 and the outlet section 36*a* of a pipe line 36. The container 10 is preferably made of metal from the viewpoint of blocking microwaves. An exhaust port 10*b* is provided in the container 10, whereby gas in the container 10 is discharged to the exterior. The container 10 also has a waveguide 10*a* that receives microwaves supplied from the microwave source 20.

(Microwave Source)

The microwave source 20 generates microwaves to heat the green honeycomb molded body 70. The wavelength of the microwaves is not particularly restricted so long as it can heat the green honeycomb molded body 70. The preferred wavelength range is 895-940 MHz or 2400-2500 MHz. The microwave source 20 is preferably one that allows the output of the microwaves to be lowered as drying proceeds. The microwave output is not particularly restricted, and may be 1 to 10 kW, for example, for each green honeycomb molded body. More specifically, the microwave output per unit weight of the green honeycomb molded body 70 is preferably 0.02 to 10 kW/kg, more preferably 0.2 to 4 kW/kg and even more preferably 1 to 3 kW/kg. If the microwave output per unit weight of the green honeycomb molded body 70 is less than 0.02 kW/kg a long time will be required for drying of the green honeycomb molded body 70, and if it exceeds 10 kW/kg, abnormal heat release may take place in the organic material in the green honeycomb molded body 70, and the green honeycomb molded body 70 will tend to undergo combustion, resulting in lower yield.

(Mounting Stage)

The mounting stage 40 is situated inside the container 10, and it is a stage for placement of the green honeycomb molded body 70 on its top side. The mounting stage 40 comprises a gas dispersion plate 42, and a non-air-permeable ring member 44 surrounding the sides of the gas dispersion plate 42. The green honeycomb molded body 70 is mounted on the gas dispersion plate 42 in such a manner that one end face on which the openings of the plurality of through-holes 70*a* are provided (the bottom side) 70*d* is facing the top side of the gas dispersion plate 42. For this embodiment the size of the top side of the gas dispersion plate 42 (the gas-releasing region) is the same size as the end face 70*d* of the green honeycomb molded body 70, but it may be slightly larger than the end face 70*d*.

The gas dispersion plate 42 is a plate with a plurality of holes running from the front to back sides, and it evens out the gas flow in the in-plane direction when gas supplied from below passes through it upward. The gas dispersion plate 42 may be a perforated plate having formed therein a plurality of holes running in straight lines from the front to back sides (for example, the same honeycomb structure as the green honeycomb molded body), but so long as it is constructed so as to allow gas to be released upward, it may be a porous board having numerous curved pores running from the front to back sides, for example.

There are also no particular restrictions on the material of the gas dispersion plate 42, which may be a ceramic such as alumina or cordierite. The thickness of the gas dispersion plate 42 may be 10 to 100 mm, for example.

When the gas dispersion plate 42 is a perforated plate, the two-dimensional configuration of the holes is not limited, and for example, it may be square, circular, hexagonal or octagonal. The sizes of the holes, with square shapes for example, may be 0.7 to 10 mm as the lengths on one of the sides. The thickness of the walls between holes may be 0.03 to 3.0 mm, for example.

When the gas dispersion plate 42 is a porous board, on the other hand, the mean pore size is not particularly restricted but is preferably 0.1 to 100 μm. The mean pore size can be measured by mercury porosimetry. The porosity is preferably 10% to 90%. It may also be a perforated plate composed of porous boards.

The ring member 44 surrounds the sides of the gas dispersion plate 42 and prevents leakage of gas from the sides.

(Heated Air Source)

The heated air source 30 comprises a blower 32 situated outside the container 10, a pipe line 36 that directs gas from the blower 32 to the bottom side of the gas dispersion plate 42, and a heater 34 provided in the pipe line 36, that heats the gas flowing through the pipe line 36. The gas heating temperature is not particularly restricted, but the minimum temperature is preferably 30° C., more preferably 40° C., even more preferably 50° C. and most preferably 70° C., and the maximum temperature is preferably 200° C., more preferably 120° C. and even more preferably 100° C. The gas is also not particularly restricted, but air is preferred from the viewpoint of economy. There are no particular restrictions on the gas flow rate, but the gas speed averaged over the area of the gas dispersion plate directly above the gas dispersion plate 42 is preferably 0.1 to 10 m/s and more preferably 0.5 to 5 m/s.

The outlet section 36a of the pipe line 36 has a diameter that enlarges with the area of the bottom side of the gas dispersion plate 42, and it contacts the bottom side of the ring member 44.

(Water Vapor Supply Port)

A water vapor supply port 10c is formed on the wall of the container 10. A water vapor source is connected to the water vapor supply port 10c via a water vapor supply line L1, and water vapor is supplied into the container 10, allowing the surroundings of each green honeycomb molded body to be kept in an atmosphere in which water vapor is present. Preferably, an amount of water vapor that saturates the inside of the container 10 is supplied from the line L1. By creating a high humidity environment inside the container 10, it is possible to minimize deformation of the green honeycomb molded body 70, and especially deformation during the initial stage of drying. The water vapor supply conditions are not particularly restricted, and for example, preferably the temperature is 100° C. to 200° C. and the supply rate is 0.1 to 5.0 kg/min. More specifically, it is preferably 0.1 to 30 kg/hr per unit weight of the green honeycomb molded body 70.

(Sealing Member)

The sealing member 80 is a member serving to prevent the heated air from the gas dispersion plate 42 from contacting the outer peripheral wall of the green honeycomb molded body 70. The sealing member 80 is disposed in such a manner as to cover the outer side of the bottom end of the green honeycomb molded body 70, and the perimeter of the gas dispersion plate 42.

The sealing member 80 is preferably made of a material that can follow the contraction that occurs during drying of the green honeycomb molded body 70. Such a material may be silicone rubber, fluorine rubber, or the like. When the sealing member 80 is made of such a material in tubular form, and situated as shown in FIG. 1(a), there are formed a section 80a extending along the axial direction (Z-direction) and a section 80b spreading out in the direction perpendicular to the Z-direction (the XY plane). Alternatively, the tubular sealing member 80 may be machined beforehand, forming a section 80a extending along the Z-direction and a section 80b spreading out in the direction horizontal to the axial direction.

In order to prevent bearing of load from the sealing member 80 on the green honeycomb molded body 70 and resulting deformation, the inner diameter D1 of the section 80a extending in the Z-direction, when not mounted, is preferably slightly smaller than the outer diameter D2 of the green honeycomb molded body 70 when dry, and the difference (D2-D1) may be about 1 to 20 mm. For example, when the diameter of the green honeycomb molded body 70 is 150 mm, the inner diameter of the sealing member 80 is preferably about 140 to 130 mm. There are no particular restrictions on the length L80b of the sealing member 80 in the Z-direction, and it may be 1 to 100 mm. The thickness of the sealing member 80 may be 0.5 to 5 mm, for example.

(Drying method)

A method of drying the green honeycomb molded body according to this embodiment will now be explained.

First, as shown in FIG. 1(a), the base side (section 80a) of the sealing member 80 is mounted on the outer side of one edge of the green honeycomb molded body 70, and the green honeycomb molded body 70 is mounted on the top side of the gas dispersion plate 42 of the container 10, with the end face 70d facing. Thus, the tip end of the sealing member 80 (section 80b) spreads out to cover the perimeter of the gas dispersion plate 42.

Next, the blower 32 is activated, together with the heater 34. Also, microwaves are supplied into the container 10 from a microwave source 20. In addition, water vapor is continuously supplied into the container from the water vapor supply port 10b, creating an atmosphere in which water vapor is present, surrounding each green honeycomb molded body 70.

This causes a water vapor-containing atmosphere to surround the green honeycomb molded body 70, and heated gas is supplied to the bottom side of the gas dispersion plate 42 through the pipe line 36, passes through the gas dispersion plate 42, passes through each of the through-holes 70a of the green honeycomb molded body 70, is discharged from the top side 70u of the green honeycomb molded body 70, and is then discharged from the exhaust port 10b of the container 10. Also, microwaves are irradiated onto the green honeycomb molded body 70. There may be a time period during which both heated air and microwaves are simultaneously supplied, and the timing for their initial or final supply does not necessarily need to be simultaneous.

Supplying heat and gas in this manner removes the solvent component of the green honeycomb molded body 70, and allows drying to proceed. As drying proceeds, the output of microwaves supplied from the microwave source 20 is preferably lowered. This has the effect of inhibiting runaway (ignition) due to local temperature increase resulting from excessive drying. There are no particular restrictions on the final extent of drying of the molded body that is reached as a result of the drying by heated air and microwaves in a water vapor atmosphere, but the dryness factor of the molded body at the point when the microwave and water vapor supply is terminated, i.e. the ratio of the solvent mass removed by drying with respect to the solvent mass before drying the molded body, is preferably at least 80%, more preferably at least 90% and even more preferably at least 95%. After terminating supply of the microwaves and water vapor, heated air alone is preferably blown to promote further drying.

According to this embodiment, creating a water vapor atmosphere around the green honeycomb molded body during the heated gas supply and microwave irradiation inhibits excessive drying of the outer sides of the green honeycomb molded body before the center section.

Also, by using a sealing member 80 capable of following contraction of the green honeycomb molded body 70, it is possible to sufficiently prevent leakage of heated air to the outer side of the green honeycomb molded body 70 during drying (see FIG. 6), and to more reliably prevent excessive drying of the outer peripheral wall of the green honeycomb molded body 70. In addition, using the sealing member 80 can effectively avoid inconveniences such as the following. Specifically, when the open area of the through-holes 70a of the green honeycomb molded body 70 is relatively small, exposure of the gas-releasing region of the gas dispersion plate 42 with contraction of the green honeycomb molded body 70 results in a large amount of heated air flowing from that region to the outer side of the molded body 70, and less gas flowing through the through-holes 70a. When this condition occurs, drying of the molded body 70 interior becomes insufficient, and problems such as collapse of the cells and cracking of the molded body are produced in the post-drying steps (for example the cutting step). According to this embodiment, such inconveniences can be adequately reduced, allowing yield to be increased.

The edges of the through-holes 70a of the green honeycomb molded body 70 dried in this manner are sealed if necessary, and subsequently fired, to obtain a ceramic honeycomb structure. The ceramic honeycomb structure can be used as a diesel particulate filter or a catalyst support in a flue gas treatment device.

<Second Embodiment>

A drying device 200 according to a second embodiment will now be explained with reference to FIG. 4 and FIG. 5. For this embodiment, only the aspects different from the first embodiment will be explained, while avoiding redundant explanation. The drying device 200 according to this embodiment accomplishes simultaneous drying of two green honeycomb molded bodies 70.

Figure 4:
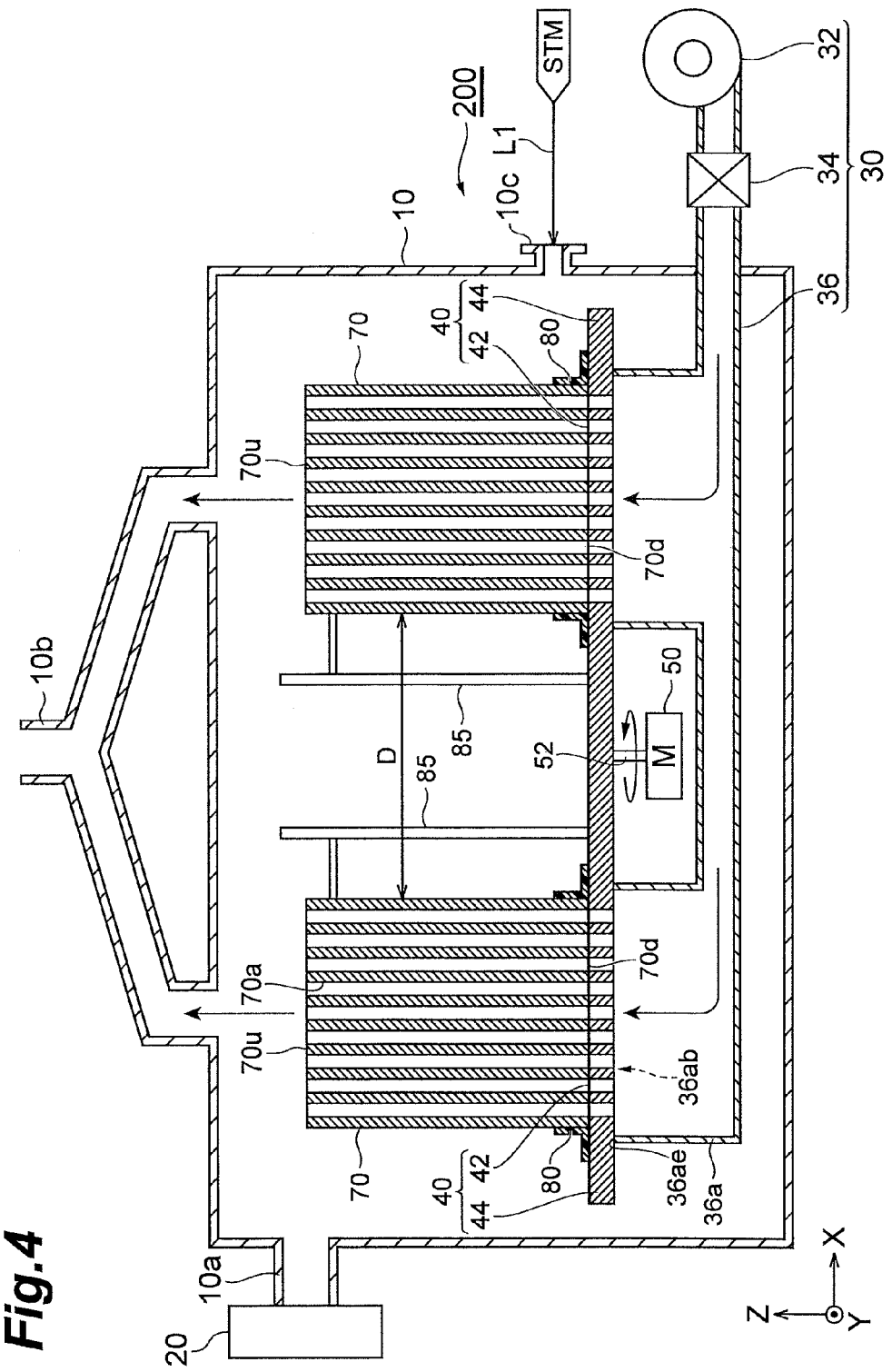
FIG. 4 is a simplified cross-sectional view of a drying device according to a second embodiment.

According to this embodiment, as shown in FIG. 4, the mounting stage 40 comprises two gas dispersion plates (gas outlets) 42 and non-air-permeable ring members 44 surrounding the sides of the two gas dispersion plates 42, and the outer shape is discoid. The two green honeycomb molded bodies 70 are mounted on the gas dispersion plates 42 in such a manner that one end face (the bottom side) 70d on which the openings of the plurality of through-holes 70a are provided is each facing the top side of the respective gas dispersion plate 42, and each sealing member 80 covers the outer side of the bottom end of the green honeycomb molded body 70 and the perimeter of the gas dispersion plate 42. Each gas dispersion plate 42 and sealing member 80 is the same as for the first embodiment. The two gas dispersion plates 42 are disposed so that the distance D between the green honeycomb molded bodies 70 mounted on the gas dispersion plates 42 is greater than $\frac{1}{2}\lambda$, where $\lambda$ is wavelength of the microwaves supplied by the microwave source 20.

A vertical shaft 52 is provided at the center bottom side of the mounting stage 40, and the vertical shaft 52 is rotatable by a motor 50. This allows the mounting stage 40 to be rotated around the vertical shaft inside the container 10. The rotational speed is not particularly restricted and may be 1 to 60 rpm.

Figure 5:
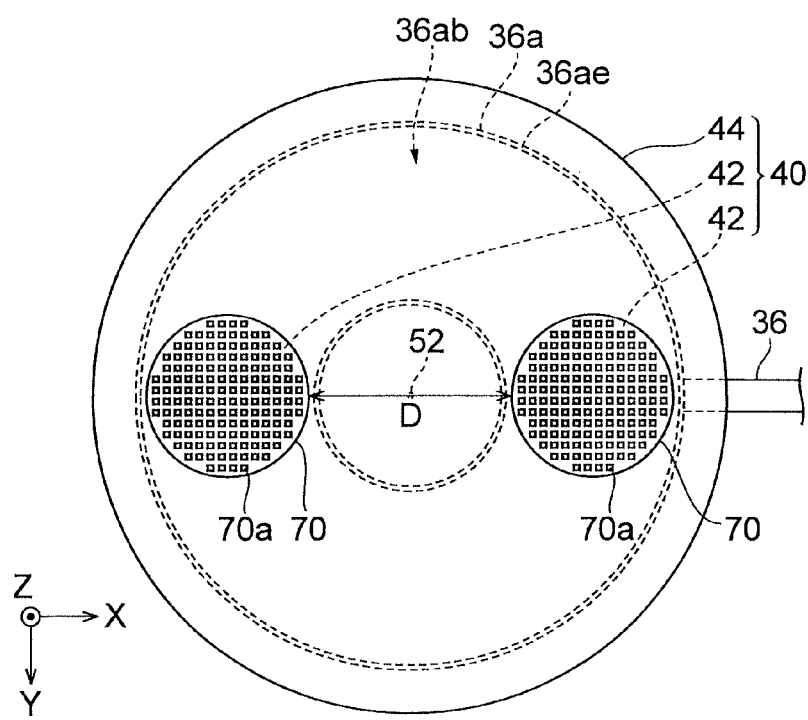
FIG. 5 is a top view of the mounting stage 40 of a drying device according to the second embodiment.

As shown in FIG. 4 and FIG. 5, an opening 36ab is provided on the outlet section 36a of the pipe line 36, facing upward and appearing as a ring shape as viewed from above. The tip 36ae of the outlet section 36a contacts with the bottom side of the ring member 44, as shown in FIG. 4. If the outlet section 36a has a ring-shaped opening 36ab facing upward in this manner, the heated air can be supplied to each of the through-holes 70a of each green honeycomb molded body 70 through the gas dispersion plate 42 serving as the gas outlet, regardless of the rotational position of the rotating mounting stage 40. The tip 36ae of the outlet section 36a is set so as to be in sliding contact with the bottom side of the ring member 44, and it can be gas-sealed.

According to this embodiment, the same function and effect are exhibited as by the first embodiment. In addition, since the spacing D between the green honeycomb molded bodies 70 is greater than ½ of the wavelength $\lambda$ of the microwaves, the microwaves can sufficiently surround the area between the green honeycomb molded bodies 70, and uniform drying of the two molded bodies is facilitated.

Furthermore, since microwaves can be efficiently utilized when multiple green honeycomb molded bodies 70 are to be dried at one time in this type of drying device 200, having the same microwave output and heated gas supply volume per green honeycomb molded body 70 allows the drying time to be shortened compared to drying each alone.

A fastener 85 may be provided to anchor the green honeycomb molded body 70 to the mounting stage 40.

The present invention is not limited to the embodiments described above, and various modified modes are possible. For example, the aforementioned embodiment has the surface of the gas dispersion plate 42 disposed horizontally, with the green honeycomb molded body 70 being placed on the top side of the gas dispersion plate 42 so that the green honeycomb molded body 70 is held, but this is not limitative. For example, the surface of the gas dispersion plate 42 may be disposed perpendicularly, and the green honeycomb molded body 70 held by another holding member in such a manner that the end face 70d of the green honeycomb molded body 70 contacts with the perpendicular surface.

Also, according to the second embodiment, two gas dispersion plates 42 are provided on the mounting stage 40, two green honeycomb molded bodies 70 are mounted on the gas dispersion plates 42 and the molded bodies are dried at one time, but three or more gas dispersion plates may instead be provided for drying of three or more green honeycomb molded bodies 70 at one time.

Also, the use of a flexible sealing member 80 was mentioned as a particularly preferred example for this embodiment, but so long as deformation of the green honeycomb molded body can be prevented during the initial stage of drying, an annular plate covering the exposed portion of the gas-releasing region may be used as the sealing member.

In addition, the second embodiment can be carried out even if the spacing between the two green honeycomb molded bodies 70 is ½ or less of the microwave wavelength $\lambda$.

Figure 6A:
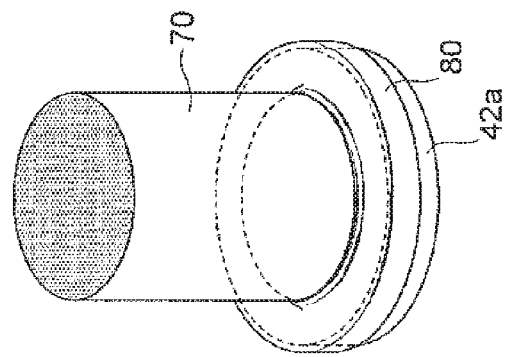
FIG. 6(a) is a perspective view showing the state of a green honeycomb molded body and stilt integrated with a sealing member.
Figure 6B:
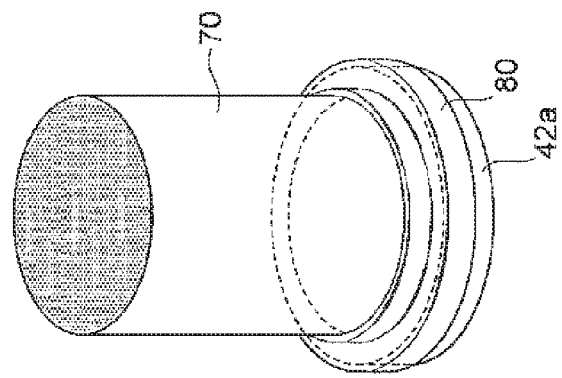
FIG. 6(b) is a perspective view showing the molded body and stilt after drying.

Also, a firing base with the same composition as the green honeycomb molded body 70 and having a through-hole structure, known as a "stilt", may be provided instead of the gas dispersion plate 42, or on the gas dispersion plate 42, and the green honeycomb molded body 70 placed thereover. In this case, as shown in FIG. 6(a), the stilt 42a and the green honeycomb molded body 70 may be integrated with the sealing member 80 beforehand, and the integrated body mounted on the gas dispersion plate 42. By using a sealing member 80 made of a material capable of following contraction of the green honeycomb molded body, it is possible to keep the perimeter of the stilt 42a (the exposed gas-releasing region) covered by the sealing member 80, as shown in FIG. 6(b).

EXAMPLES

Example (Method for Producing Honeycomb Molded Body)

The following powder was used as the inorganic compound source powder to obtain a green honeycomb molded body. The charging composition for the inorganic compound source powder was $[Al_2O_3]/[TiO_2]/[MgO]/[SiO_2]=35.1\%/51.3\%/9.6\%/4.0\%$, as the molar percentages based on alumina $[Al_2O_3]$, titania $[TiO_2]$, magnesia [MgO] and silica $[SiO_2]$. The content of the silicon source powder was 4.0 wt % with respect to the total of the aluminum source powder, titanium source powder, magnesium source powder and silicon source powder.

(1) Aluminum Source Powder

α-Alumina Powder with Mean Particle Size Listed in Table 1

24.6 parts by weight (2) Titanium Source Powder

Rutile Titania Powder with Mean Particle Size Listed in Table 1

42.0 parts by weight (3) Magnesium Source Powder
Magnesia Spinel Powder with Mean Particle Size Listed in Table 1
15.7 parts by weight
(4) Silicon Source Powder
Glass frit with mean particle size listed in Table 1 (CK0832 by Takara Standard)
3.4 Parts by Weight To a mixture comprising aluminum source powder, titanium source powder, magnesium source powder and silicon source powder there were added 14.3 parts by weight of corn starch having the mean particle size listed in Table 1, as a pore-forming agent, 5.5 parts by weight of methyl cellulose (trade name: METOLOSE 90SH-30000) as an organic binder, 4.6 parts by weight of polyoxyethylene polyoxypropylene butyl ether (trade name: UNILUBE 50 MB-72, viscosity at 20° C.: 1020 mPa·s) as a plasticizer, and 0.3 part by weight of glycerin as a lubricant, and after further adding 27 parts by weight of water as a dispersing medium (solvent), a kneader was used for kneading at 25° C. to prepare a green body (starting mixture for molding). Next, the green body was extrusion molded to produce a plurality of green honeycomb molded bodies. The green honeycomb molded bodies were circular columnar (length: 220 mm) with numerous through-holes, the numerous through-holes being arranged in a matrix-shaped square (see FIG. 2). The cross-sectional shapes of the through-holes were square with 1.43 mm sides, and the partition thickness was 0.32 mm.

TABLE 1

|  | Mean particle size (μm) |
| --- | --- |
| Alumina | 36.1 |
| Titania | 0.5 |
| Magnesia spinel | 5.2 |
| Glass frit | 8.8 |
| Corn starch | 15.4 |

The green honeycomb molded bodies were dried with a drying device such as shown in FIG. 1. Specifically, drying treatment was carried out with a sealing member having an inner diameter slightly smaller than the diameter of the green honeycomb molded body (thickness: 1 mm, length: 10 mm, material: silicone rubber) mounted on each green honeycomb molded body, as shown in FIG. 1.

The drying conditions were as follows.
Specifications of Gas Dispersion Plate:
  Material: alumina;
  Thickness: 40 mm;
  Two-dimensional configuration of holes: square with 5.2 mm sides; and
  wall thickness: 1.1 mm.

The microwave frequency was 2.45 GHz, and the microwave output was 24 kW up to a drying time of 0 to 5.5 minutes and 14.4 kW from 5.5 to 11 minutes.

The supply gas was air, and the supply gas heating temperature was 70° C. The gas supply rate was set so that the gas speed averaged over the area of the gas dispersion plate directly above the gas dispersion plate was 1 m/s. The temperature of the water vapor was 120° C., and the supply rate was 1.4 kg/min. The microwave exposure time was from time 0 to 11 minutes, the water vapor supply was from time 0 to 5.5 minutes, and the heated air supply was from time 0 to 11 minutes.

No deformation or cracking was seen in the green honeycomb molded bodies of the examples. The dryness factor of the green honeycomb molded body was 91.9%. The dryness factor is the value calculated by the following formula, based on the values of the weight of the green honeycomb molded body before drying and the weight after drying.

Dryness factor(%)=(Weight before drying−weight after drying)/(weight before drying×water content)×100

(Comparative Example)

Drying treatment of a green honeycomb molded body was carried out in the same manner as the examples except that no sealing member was used. The dried molded body had a smaller outer diameter at the lower end than the other sections, and numerous creases were observed in the peripheral surface of the lower section of the molded body. The dryness factor of the green honeycomb molded body was 73.8%.

INDUSTRIAL APPLICABILITY

According to the invention it is possible to provide a drying device and a drying method for a green honeycomb molded body, that can prevent deformation and cracking of the green honeycomb molded body during drying.

REFERENCE SIGNS LIST

10: Container, 10b: water vapor supply port, 20: microwave source, 30: heated air source, 42: gas dispersion plate, 42a: stilt (gas dispersion plate), 70: green honeycomb molded body, 70a: through-hole, 70d: end face, 80: sealing member, 100, 200: drying device.

The invention claimed is:

1. A method of drying a green honeycomb molded body having a plurality of through-holes, using microwaves and heated air, the method comprising the steps of:
  mounting a green honeycomb molded body on a gas dispersion plate capable of releasing heated air; and
  irradiating the green honeycomb molded body with microwaves simultaneously while supplying heated air through the gas dispersion plate into the through-holes of the green honeycomb molded body, in an atmosphere containing water vapor surrounding the green honeycomb molded body;
  wherein prior to the supply of heated air and the irradiation of microwaves, a sealing member is situated on the outer side of an edge of the green honeycomb molded body on the gas dispersion plate side, to prevent the heated air from the gas dispersion plate from contacting the outer peripheral wall of the green honeycomb molded body, the sealing member is made of a material capable of following the contraction that occurs during drying of the green honeycomb molded body, the sealing member has a ring shape and the sealing member covers an outer side of a bottom end of the green honeycomb molded body, and a perimeter of the gas dispersion plate.

2. The method according to claim 1, wherein the region of the gas dispersion plate through which heated air is released is larger than the end face of the green honeycomb molded body, the sections of the region not covered by the end face of the green honeycomb molded body being plugged by the sealing member.

3. A drying device for a green honeycomb molded body having a plurality of through-holes, the device comprising:
  a container;

a microwave source that supplies microwaves into the container;

a heated air source that supplies heated air into the container;

a water vapor supply port that supplies water vapor into the container;

a gas dispersion plate in the container, that supplies heated air from the heated air source onto one end face on which the openings of the plurality of through-holes are formed in the green honeycomb molded body; and a sealing member situated on the outer side of an edge on the gas dispersion plate side of the green honeycomb molded body, that prevents heated air from the gas dispersion plate from contacting the outer peripheral wall of the green honeycomb molded body, wherein the sealing member is made of a material capable of following the contraction that occurs during drying of the green honeycomb molded body, the sealing member has a ring shape and the sealing member covers an outer side of a bottom end of the green honeycomb molded body, and a perimeter of the gas dispersion plate.

4. The device according to claim 3, wherein the region of the gas dispersion plate through which heated air is released is larger than the end face of the green honeycomb molded body, and the sealing member plugs the sections of the region not covered by the end face of the green honeycomb molded body.

* * * * *